United States Patent [19]

Sakamoto et al.

[11] Patent Number: 4,851,754
[45] Date of Patent: Jul. 25, 1989

[54] VELOCITY CONTROL SYSTEM

[75] Inventors: Keiji Sakamoto; Yukio Toyosawa, both of Hachioji, Japan

[73] Assignee: Fanuc Ltd, Minamitsuru, Japan

[21] Appl. No.: 66,628

[22] PCT Filed: Oct. 17, 1986

[86] PCT No.: PCT/JP86/00527
§ 371 Date: Jun. 15, 1987
§ 102(e) Date: Jun. 15, 1987

[87] PCT Pub. No.: WO87/02485
PCT Pub. Date: Apr. 23, 1987

[30] Foreign Application Priority Data

Oct. 17, 1985 [JP] Japan ............................ 60-231847

[51] Int. Cl.$^4$ ............................................. G05B 5/01
[52] U.S. Cl. ................................... 318/616; 318/615
[58] Field of Search ................. 318/609, 615, 616

[56] References Cited

U.S. PATENT DOCUMENTS

| 4,109,190 | 8/1978 | McNaughton | 318/609 |
| 4,418,305 | 11/1983 | Otsuki et al. | 318/616 |
| 4,691,152 | 9/1987 | Ell et al. | 318/616 |
| 4,695,780 | 9/1987 | Kurakake | 318/615 X |

FOREIGN PATENT DOCUMENTS 0217727 4/1987 European Pat. Off. ............ 318/615

OTHER PUBLICATIONS

Patent Abstracts of Japan, vol. 9, No. 56, Mar. 12, 1985–JP-A-59 194 689.
Patent Abstracts of Japan, vol. 8, No. 239, Nov. 2, 1984 & JP-A-59 117 478.

*Primary Examiner*—Bentsu Ro
*Attorney, Agent, or Firm*—Staas & Halsey

[57] ABSTRACT

A velocity control system in which, when an observer is used to estimate velocity based on position information from a rotary encoder, load torque, which is a cause of a steady-state estimation error, is estimated at the same time and velocity is controlled by using the estimated value. Velocity control of the motor is executed by feeding back the position information from the rotary encoder to an integration element in the I-P controller.

3 Claims, 3 Drawing Sheets

Fig. 4
PRIOR ART
Fig. 5
PRIOR ART
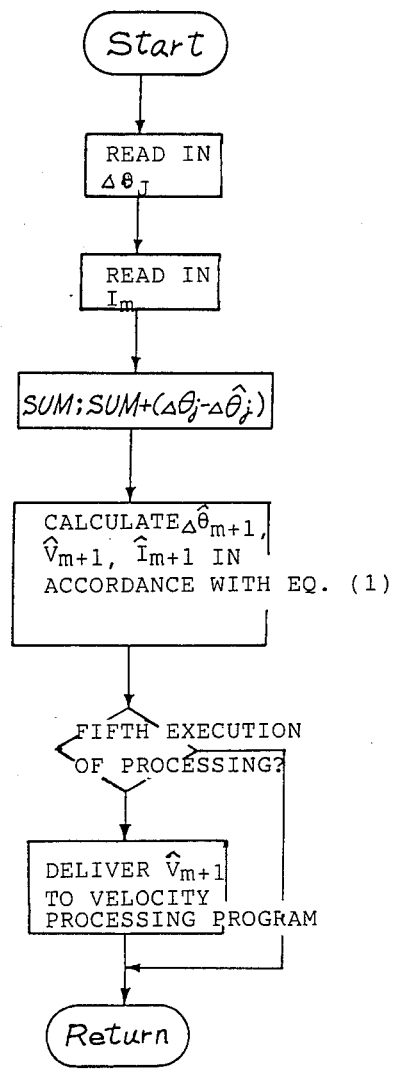
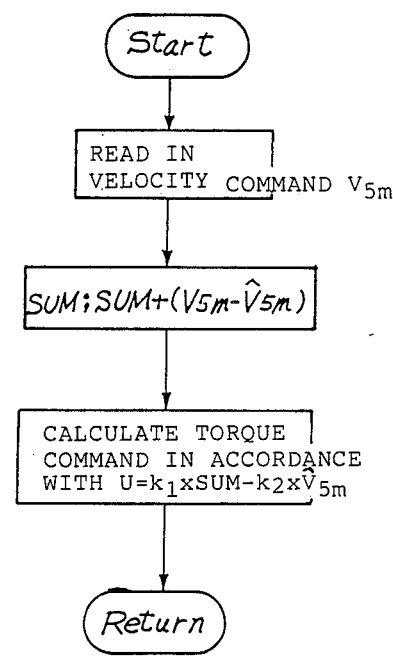

VELOCITY CONTROL SYSTEM

BACKGROUND OF THE INVENTION

This invention relates to a velocity control system and, more particularly, to a velocity control system in which velocity is controlled by using an observer to estimate velocity on the basis of position information.

By virtue of the rapid progress which has been made in technology, digital feedback control of a variety of motors by microcomputer has become commonplace. When subjecting a motor to feedback control by using a microcomputer, it is necessary to sense the actual velocity of the motor. To this end, conventional practice is to use a rotary encoder, by way of example. The rotary encoder is adapted to generate from several thousand to 20,000 pulses per revolution of the motor, the frequency of these output pulses being proportional to the rotational velocity of the motor.

However, the spacing between adjacent pulses becomes very wide and the pulses become discrete in nature, especially when the motor rotates at a low velocity. When these pulses are used directly as motor velocity information, irregular rotation is the result.

Thus, when an attempt is made to use a position sensing rotary encoder for sensing velocity as well, highly precise, smooth velocity cannot be carried out due to the fact that velocity resolution is poor in comparison with an analog-type sensor.

Accordingly, a velocity control system has been proposed in which, when an observer is used to estimate velocity based on position information from a rotary encoder, load torque, which is a cause of a steady-state estimating error, is estimated at the same time to enable highly precise, smooth velocity control.

FIG. 2 is a block diagram of such a velocity control system. Numerals 1 through 3 denote arithmetic units, 4 an observer, 5 a motor and 6 an I-P controller formed by an integration element $K_1/S$ and a proportion element $K_2$. $V_c$ represents a velocity command, U a torque command signal, I motor current and $I_L$ current indicative of a load torque. V represents velocity, $\theta$ position, $k_1$ integration gain, $k_2$ feedback gain, $K_m$ a motor constant, and $T_m$ a ratio between $L_a$ and $R_a$, namely the value of $L_a/R_a$, where Ra denotes motor winding resistance and $L_a$ represents inductance. Further, $K_t$ is a torque constant, J stands for inertia which is the total of the load and motor inertia, and $K_p$ is a conversion coefficient decided by the rotary encoder. S represents d/dt. Further, the observer per se is one commonly in use. An arrangement in which a velocity sensor is combined with the observer has been proposed in Japanese patent application No. 59-55114.

The operation of this velocity control system will now be described.

First, the arithmetic unit 1 produces an output indicative of the difference between the velocity command and an estimated value $\hat{V}$ of velocity, described below. The output signal is integrated and then applied to the arithmetic unit 2. The result of multiplying the estimated value $\hat{V}$ of velocity by the feedback gain $k_2$ is applied to the arithmetic unit 2, which outputs the difference between its two input signals as the torque command U, thereby controlling the motor 5. The velocity of the motor is output as V, and the position $\theta$ is sensed by a rotary encoder. The information indicative of the position $\theta$ includes the results of adding the current $I_L$, which is indicative of the load torque (Coulomb friction), at the arithmetic unit 3.

In this velocity control system, the estimated value of velocity is obtained by using the observer 4. At this time the load torque, which is a cause of a steady-state estimation error, is estimated simultaneously. Specifically, the position information $\theta$, which takes into account the motor current I and the current $I_L$ indicative of load torque, is applied to the observer 4, which proceeds to output the estimated value V of velocity.

Let us describe this point in detail. If an identity observer is constructed for the motor current I, velocity V, position $\theta$ and current $I_L$ due to load torque, we will have $$\begin{bmatrix} \dot{\theta} \\ \dot{V} \\ \dot{I}_L \end{bmatrix} = \begin{bmatrix} 0 & K_p & 0 \\ 0 & 0 & -\frac{K_t}{J} \\ 0 & 0 & 0 \end{bmatrix} \begin{bmatrix} \theta \\ V \\ I_L \end{bmatrix} + \frac{K_t}{J} \begin{bmatrix} 0 \\ 1 \\ 0 \end{bmatrix} I$$

What are actually sensed and applied to the observer 4 are the motor current I and the position $\theta$. An identity observer for digital processing is as follows:

$$\begin{bmatrix} \hat{\theta}_{n+1} \\ \hat{V}_{n+1} \\ \hat{I}_{Ln+1} \end{bmatrix} = \begin{bmatrix} 1-\lambda_1 & K_pT & -\frac{K_pK_t}{2J}T^2 \\ -\lambda_2 & 1 & -\frac{K_t}{J}T \\ -\lambda_3 & 0 & 1 \end{bmatrix} \begin{bmatrix} \hat{\theta}_n \\ \hat{V}_n \\ \hat{I}_{Ln} \end{bmatrix} + \begin{bmatrix} \lambda_1 \\ \lambda_2 \\ \lambda_3 \end{bmatrix} \theta + \frac{K_t}{J} \begin{bmatrix} \frac{K_p}{2}T^2 \\ T \\ 0 \end{bmatrix} I$$

where T is a sampling period and $\lambda_1$, $\lambda_2$, and $\lambda_3$ are the observer gains. These values are inversely proportional to time needed for the estimated value to converge to a true value.

In order to process the above by a microprocessor, the observer is implemented by the following algorithm:

$$\begin{aligned}
\Delta\hat{\theta}_{m+1} &= \lambda_1 \sum_{i=0}^{m}(\Delta\theta_i - \Delta\hat{\theta}_i) + \\
&\quad K_pTV_m + \frac{K_pK_t}{2J}T^2(I_m - \hat{I}_{Lm}) \\
\hat{V}_{m+1} &= \hat{V}_m + \lambda_2 \sum_{i=0}^{m}(\Delta\theta_i - \Delta\hat{\theta}_i) + \\
&\quad \frac{K_tT}{J}(I_m - \hat{I}_{Lm}) \\
\hat{I}_{Lm+1} &= \hat{I}_{Lm} + \lambda_3 \sum_{j=0}^{m}(\Delta\theta_i - \Delta\hat{\theta}_i)
\end{aligned} \quad (1)$$

FIG. 3 is a view useful in describing information processing for obtaining the estimated value $\hat{V}$ of velocity. FIG. 3(a) is for describing the processing level (j) of a motor current loop, and FIG. 3(b) is for describing a velocity processing level (m).

The observer is equipped with a hardware counter for integrating a number of pulses $\Delta\theta$ which arrive from the rotary encoder in the sampling time period T. In this case, it is assumed that the observer gains $\lambda_1$, $\lambda_2$, and $\lambda_3$ which will bring an estimation error to zero at a fifth step are calculated and given in advance.

FIG. 4 illustrates a flowchart of processing performed by the observer 4 at the motor current loop processing level. FIG. 5 illustrates a flowchart of velocity loop processing.

First, with regard to the motor current loop, the observer 4 reads in position information $\Delta\theta_j$ from position pulses during one sampling period T, and motor current $I_m$. Next, these are integrated. Then, based on Eq. (1), position estimation information $\Delta\hat{\theta}_{m+1}$, velocity estimation information $\hat{V}_{m+1}$ and current estimation information $\hat{I}_{Lm+1}$ indicative of load are calculated. When this processing has been performed for the fifth time, $\hat{V}_{m+1}$ is delivered to a velocity processing program. This relationship is evident from FIGS. 3(a) and 3(b).

Next, in velocity loop processing as indicated by the flowchart of FIG. 5, the observer reads in velocity commands $V_{5m}$ and then calculates the summation of $V_{5m} - \hat{V}_{5m}$, where $\hat{V}_{5m}$ is derivative information them. Next, the integrated value is multiplied by the integration gain $k_1$ and from this product is subtracted the product of velocity estimation information $\hat{V}_{5m}$ and feedback gain $k_2$, whereby the torque command $U_{5m}$ is obtained.

In such velocity control using an observer, the estimated velocity value $\hat{V}$ obtained by the observer 4 is fed back to the input side of the integration element $K_1/S$ of the I-P controller and to the proportion element $K_2$ of the I-P controller. The irregular rotation of the motor at low velocity is eliminated. When the motor rotates at a high velocity, however, the error in the estimated velocity due to cancelling in the calculations in the observer 4 is accumulated during each sampling period. Therefore, the stability of the feedback loop cannot be performed by the integration element which eliminates an offset quantity from the torque command and accurate velocity control cannot be performed.

The present invention solves the aforementioned problem of the prior art and its object is to provide a highly accurate velocity control system in which the estimated velocity value obtained by the observer is fed back to the proportion element of the I-P controller and the position information itself is fed back to the input side of the integration element.

SUMMARY OF THE INVENTION

The present invention provides a velocity control system in which position information from a rotary encoder mounted on a servomotor driving a mechanical load is fed back and a torque command is produced for application to the servomotor. Position information from a rotary encoder is fed back to an integration element of an I-P controller, and an observer is provided for estimating velocity on the basis of the position information and servomotor current. The observer incorporates load torque in the estimated velocity value, feeds back this estimated velocity value to a proportion element in the I-P controller, and obtains torque command information, which is applied to the servomotor, from the output side of the I-P controller.

BRIEF DESCRIPTION OF THE DRAWINGS

FIGS. 4 and 5 are flowcharts of the operation of a velocity control system.

DESCRIPTION OF THE PREFERRED EMBODIMENT

Figure 1:
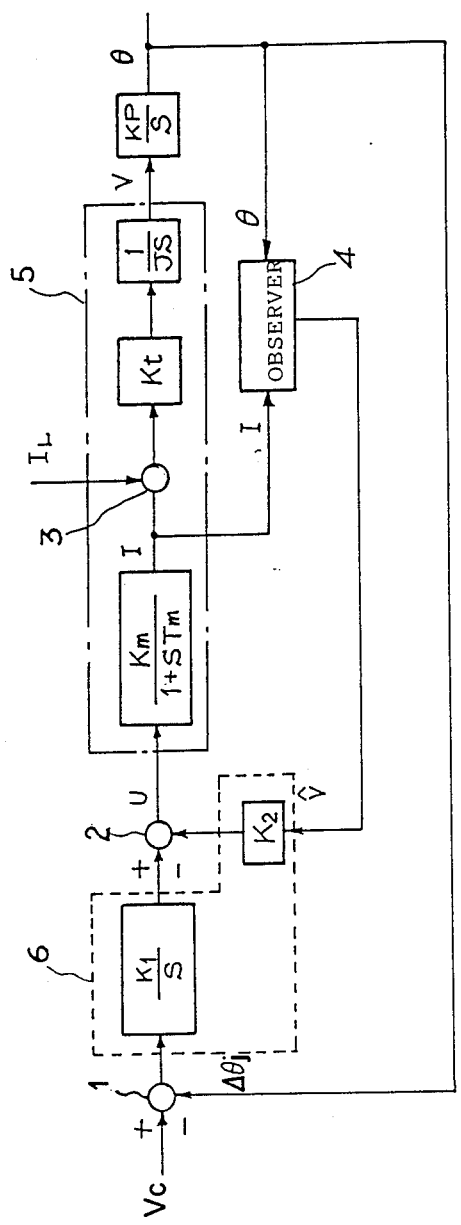
FIG. 1 is a block diagram of the present invention.
Figure 2:
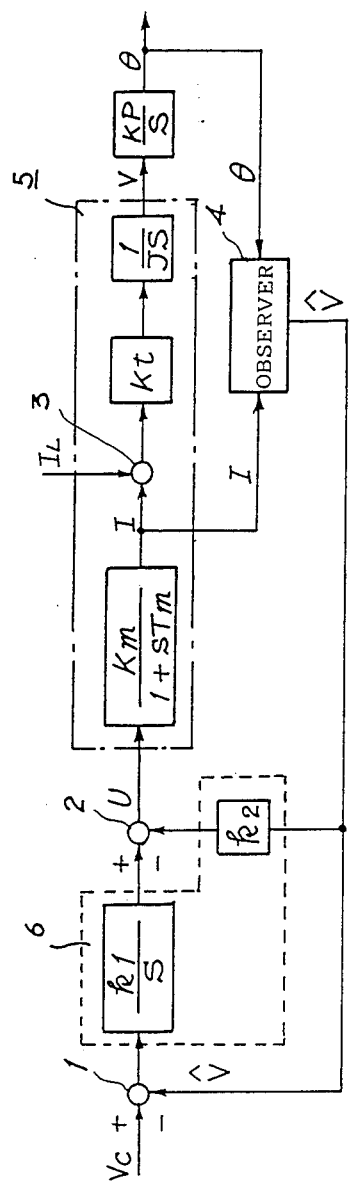
FIG. 2 is a block diagram showing an example of the prior art.
Figure 3:
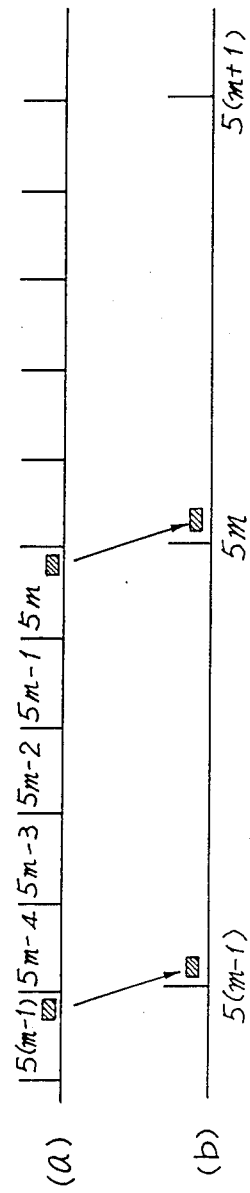
FIG. 3 is a diagram of the operation of the device in FIG. 2.

An embodiment of the present invention will now be described in conjunction with the drawings. FIG. 1 is a block diagram of the present invention. In accordance with the invention, the estimated velocity value $\hat{V}$ obtained by the observer 4 is fed back to the proportional element $K_2$ of the I-P controller 6, and the information $\theta$ indicative of the position of motor 5 obtained by the rotary encoder is fed back to the arithmetic unit 1 provided on the input side of the integration element $K_1/S$ of I-P controller 6. In other respects the arrangement is the same as that of the prior-art example shown in FIG. 2.

Thus, the estimated velocity value $\hat{V}$ obtained by the observer 4 is fed back solely to the proportion element $K_2$ of the I-P controller, and the position information $\Delta\theta_j$, regarded as an average velocity during one sampling period, is fed back to the input side of the integration element of the I-P controller. As a result, the offset quantity can be removed from the torque command U during any velocity of the motor.

When an error signal is input to the integration element, the error signal is integrated, errors are accumulated and the output signal of the integration element develops a large error. In accordance with the present invention, however, an error-free position signal, which can be regarded as an average velocity, is fed back to the integration element, so that the output of the integration element does not contain an error component. Further, since the proportion element can be thought of as being a stable element in comparison with the integration element, a problem such as that described above does not arise.

Although the invention has been described in its preferred form with a certain degree of particularity, it is obvious that the present disclosure of the preferred form can be modified in the details of construction, and that various modifications or combinations thereof can be made without departing from the spirit of the invention described in the claims.

In accordance with the present invention, highly precise, stable velocity control can be carried out since an offset quantity is removed from the torque command obtained on the output side of the I-P controller. Therefore, if the invention is used in a motor control circuit for driving the arm of an industrial robot, this will make it possible to achieve highly accurate positional control of the arm. It goes without saying that the invention can also be applied to the servomotor circuit of a machine tool.

We claim:

1. A velocity control system in which digital position information from a rotary encoder mounted on a motor is fed back during each period of sampling and a torque command information is produced for application to the motor, said system comprising:
   an integral-proportional (I-P) controller including an integration element and a proportion element;
   means for providing feedback position information during one sampling period from the rotary encoder observer means, coupled to said means for providing feedback position information and said proportion element of said I-P controller, for estimating velocity based on the position information and motor current and outputting an estimated velocity value to said proportion element of said I-P controller;

first calculating means, coupled to said integration element and said proportion element of said I-P controller, for calculating the torque command information for the motor based on an output from said integration element and said proportion element; and second calculating means, connected to said means for providing feedback position information and the integration element of said I-P controller, for receiving the feedback position information and a velocity command signal and outputting an average velocity during one sampling period to said integration element of said I-P controller.

2. A velocity control system according to claim 1, wherein at least one of said means for providing feedback position information, said observer means, said first calculating means, and said second calculating means comprising a control means.

3. A velocity control system according to claim 2, wherein said control means is a microcomputer.

* * * * *

UNITED STATES PATENT AND TRADEMARK OFFICE
CERTIFICATE OF CORRECTION

PATENT NO. : 4,851,754

DATED : JULY 25, 1989

INVENTOR(S) : KEIJI SAKAMOTO ET AL.

It is certified that error appears in the above-identified patent and that said Letters Patent is hereby corrected as shown below:

Col. 2, line 50, "$K_p TVm$" should be --$K_p T\hat{V}m$--.

Col. 3, line 13, "$\hat{L}_{Lm+1}$" should be --$\hat{I}_{Lm+1}$--.

Signed and Sealed this

Eighth Day of May, 1990

*Attest:*

HARRY F. MANBECK, JR.

*Attesting Officer*      *Commissioner of Patents and Trademarks*